US010738750B2

(12) United States Patent
He et al.

(10) Patent No.: US 10,738,750 B2
(45) Date of Patent: Aug. 11, 2020

(54) LOW IMPACT NOISE SOLENOID VALVE

(71) Applicant: HITACHI, LTD., Tokyo (JP)

(72) Inventors: Qifan He, Farmington Hills, MI (US); Akira Inoue, Farmington Hills, MI (US)

(73) Assignee: HITACHI, LTD., Tokyo (JP)

( * ) Notice: Subject to any disclaimer, the term of this patent is extended or adjusted under 35 U.S.C. 154(b) by 78 days.

(21) Appl. No.: 16/044,839

(22) Filed: Jul. 25, 2018

(65) Prior Publication Data
US 2020/0032753 A1  Jan. 30, 2020

(51) Int. Cl.
*H01F 7/08* (2006.01)
*F16K 31/06* (2006.01)
*F02M 59/46* (2006.01)
*F02M 63/00* (2006.01)
*H01F 7/16* (2006.01)

(52) U.S. Cl.
CPC ...... *F02M 59/466* (2013.01); *F02M 63/0019* (2013.01); *F16K 31/0655* (2013.01); *F16K 31/0696* (2013.01); *H01F 7/088* (2013.01); *H01F 7/1623* (2013.01); *H01F 2007/086* (2013.01)

(58) Field of Classification Search
CPC ............ F16K 31/0655; F16K 31/0696; F02M 63/0019; H01F 7/1623; H01F 7/11; H01F 7/12; H01F 7/088; H01F 2007/086
USPC ..................... 251/129.15; 335/236, 279, 297
See application file for complete search history.

(56) References Cited

U.S. PATENT DOCUMENTS

| 5,467,962 A * | 11/1995 | Bircann | F02M 26/53 251/129.15 |
| 5,663,700 A | 9/1997 | Spence et al. | |
| 6,268,784 B1 * | 7/2001 | Feigel | B60T 8/363 251/129.15 |
| 6,877,717 B2 * | 4/2005 | Collins | B60T 8/363 251/129.15 |
| 6,943,657 B2 * | 9/2005 | Subramanian | F16K 31/0637 335/261 |

(Continued)

FOREIGN PATENT DOCUMENTS

WO    2012/032594 A1    12/2013

OTHER PUBLICATIONS

Japanese Office Action received in corresponding Japanese Application No. 2019-035339 dated Mar. 3, 2020.

*Primary Examiner* — Matthew W Jellett
(74) *Attorney, Agent, or Firm* — Mattingly & Malur, PC

(57) ABSTRACT

In some examples, a static part includes a static body and a first cylindrical extension extending from the static body, the first cylindrical extension including an open end with a cylindrical inner surface having a first diameter. A moveable part is moveable toward the static part by the magnetic flux of a solenoid. The moveable part may include a moveable body and a second cylindrical extension extending from the moveable body, the second cylindrical extension including a cylindrical outer surface having a second diameter, smaller than the first diameter, to enable the cylindrical outer surface to move within the open end. The second diameter is sized for the cylindrical outer surface to pass adjacent to the cylindrical inner surface to enable passage of a portion of the magnetic flux radially to reduce an energy of impact between the moveable part and the static part.

18 Claims, 14 Drawing Sheets

(56) References Cited

U.S. PATENT DOCUMENTS

| | | | |
|---|---|---|---|
| 8,870,160 B2* | 10/2014 | Ambrosi | F16K 31/0696 |
| | | | 251/337 |
| 8,973,894 B2* | 3/2015 | Ozaki | F16K 31/0655 |
| | | | 251/129.15 |
| 9,133,954 B2 | 9/2015 | Sato et al. | |
| 10,170,227 B2* | 1/2019 | Tanaka | H01F 3/00 |
| 10,424,429 B2* | 9/2019 | Fatemi | H01F 7/1653 |
| 2004/0227604 A1 | 11/2004 | Mitteer et al. | |
| 2007/0246673 A1* | 10/2007 | Bircann | F16K 31/0655 |
| | | | 251/129.15 |
| 2013/0001450 A1* | 1/2013 | Hirota | F04B 1/295 |
| | | | 251/129.15 |
| 2016/0305384 A1 | 10/2016 | Avireddi et al. | |
| 2017/0152824 A1 | 6/2017 | Seera et al. | |

* cited by examiner

LOW IMPACT NOISE SOLENOID VALVE

BACKGROUND

A solenoid-actuated valve may operate in a system to control the flow of a fluid, such as a liquid or gas. When a solenoid coil of the solenoid is energized with electricity, the solenoid coil generates a magnetic field that pulls one moveable valve part towards another static part. Thus, electric energy is converted to kinetic energy. The moveable part with high kinetic energy may impact the static part, resulting in a ticking noise, such as due to metal-on-metal impact. In some environments, this may cause a repetitive ticking noise that may be annoying and irritating to people. For instance, an audible ticking noise emanating from the solenoid valve of fuel pump in a vehicle when the vehicle is idling may be perceived by a person as being rough and unrefined, or may otherwise degrade the person's perception of the vehicle.

SUMMARY

Some implementations include arrangements and techniques for reducing the impact between a moveable part and a static part associated with a solenoid. In some examples, the static part includes a static body and a first cylindrical extension extending from the static body. For example, the first cylindrical extension may include an open end with a cylindrical inner surface having a first diameter. The moveable part is moveable toward the static part by the magnetic flux generated by the solenoid. The moveable part may include a moveable body and a second cylindrical extension extending from the moveable body. For example, the second cylindrical extension may include a cylindrical outer surface having a second diameter, smaller than the first diameter, to enable the cylindrical outer surface to move within the open end. The second diameter is sized for the cylindrical outer surface to pass adjacent to the cylindrical inner surface to enable passage of a portion of the magnetic flux radially to reduce an energy of impact between the moveable part and the static part.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
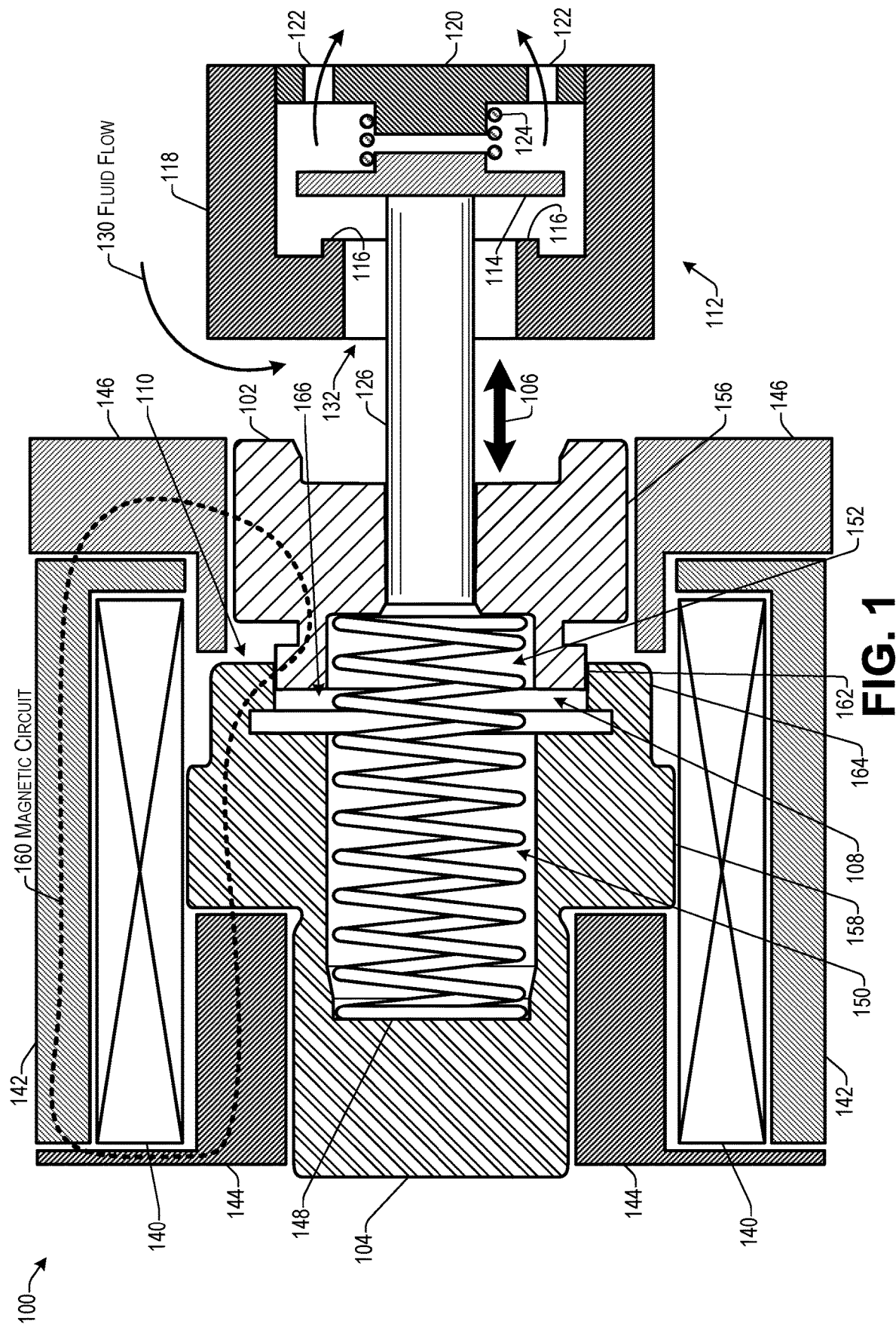
FIG. 1 illustrates a cross-sectional view of an example solenoid valve according to some implementations herein.

The technology herein includes novel arrangements and techniques for reducing the impact noise in a solenoid actuated valve. For instance, some examples are able to attain a relatively consistent magnetic solenoid force on a movable part that reduces the impact force of the movable part against a static part, thereby reducing the ticking noise typically associated with a solenoid valve. Some implementations are able to reduce the impact noise by modifying the shape of the movable part and the static part to provide a desired effect on the magnetic force acting on the movable part of the valve. In addition, some implementations include a non-magnetic spacer ring having an inwardly extending flange that is interposed at least partially between the movable part and the static part to modify the magnetic force profile, thereby further reducing the acceleration of the movable part toward the static part in a desired manner for reducing the impact force.

In some examples, the shape of a mating portion of the movable part and the shape of a mating portion of the static part are each configured with a radial groove, thereby providing what may be referred to herein as a hook shaped member to the respective mating portions when viewed in cross section. The hook shaped members on the movable part and the static part interfit with each other and cause an axial magnetic force exerted by the solenoid to be maintained at a generally more constant level due to a bypass of the magnetic flux when the movable part moves toward and engages with the static part following activation of the solenoid coil. For example, in a conventional configuration, the magnetic flux may pass directly from the movable part to the static part as the movable part moves forward, abuts, and impacts against the static part. Thus, conventionally, the magnetic flux passes mainly through a main gap between the movable part and the static part, and causes the movable part to continue to accelerate as the moveable part moves closer to the static part, thereby increasing the force of impact.

In the implementations herein, the moveable part is sized so that the hook member on the mating end of the movable part fits within an opening of the mating end of the static part. Thus, the magnetic flux may be bypassed through the hook members of the moveable part and the static part when the respective hook members draw adjacent to each other. For example, the magnetic flux passing through the main gap generates an initial axial force that pulls the moveable part toward the static part. As the hook shaped members become adjacent to each other, a portion of the magnetic flux is bypassed from the moveable hook to the non-moveable hook thereby resulting in a more consistent magnetic force at about a midway point, rather than an increasing force, as in the conventional arrangement. Accordingly, implementations herein are able to reduce the valve ticking noise by slowing the acceleration and/or velocity of the movable part before the movable part impacts against the static part.

In addition, a non-magnetic spacer ring may be included in some examples, and may have a flange that extends inward between the movable part and the static part. In some examples, the ring may be generally T-shaped in cross-section, and may be positioned and sized to make a force profile of the magnetic force applied to the moveable part steadier. Thus, the non-magnetic spacer ring can prevent a sudden rise in magnetic force when the gap between the moveable part and the static part is small. As a result, the kinetic energy of the moveable part may be greatly reduced resulting in substantially less impact noise from the moveable part contacting the static part. For example, the non-magnetic spacer ring may be positioned on one of the moveable part or the static part, and when so positioned, the inwardly extending flange of the spacer ring may ensure that there is some clearance between the moveable part and the static part. The non-magnetic spacer ring may be constructed of a material that has a lower magnetic permeability and a much higher reluctance than the moveable part or the static part. Thus, the reluctance created by the gap between the moveable part and the static part may lower the magnetic force exerted by the solenoid coil as the movable part moves toward the static part.

Through the techniques and arrangements described above, implementations herein may reduce the noise and vibration in a solenoid actuated valve. For example, in the case of a valve in a gasoline direct injection fuel pump, the examples herein may reduce a ticking sound common with these types of pumps. Furthermore, by incorporating the implementations herein, the durability of a pump may be improved and the pump operation may be quieter. Further, the examples herein may be applicable to any other mechanical components that include solenoid-actuated valves or the like.

For discussion purposes, some example implementations are described in the environment of a solenoid valve having lower impact noise, such as may be used in conjunction with a pump or various other types of devices. However, implementations herein are not limited to the particular examples provided, and may be extended to other service environments, other types of valves, other types of fluids, other types of solenoid-actuated devices, and various other applications, as will be apparent to those of skill in the art in light of the disclosure herein.

FIG. 1 illustrates a cross-sectional view of an example solenoid valve 100 according to some implementations herein. The valve 100 includes a moveable part 102, which may also be referred to as an anchor in some examples. The moveable part 102 is able to move toward and away from a static part 104, which may also be referred to as a core in some examples. As indicated by arrow 106, a mating end 108 of the moveable part 102 may be moved into and away from engagement with a mating end 110 of the static part 104 for closing and opening a valve mechanism 112, such as in a reciprocating manner.

In this example, the valve mechanism 112 includes a valve member 114 able to engage with a valve seat 116 formed in a valve mechanism body 118. The valve mechanism body 118 further includes a base 120 having fluid openings 122. A valve spring 124 biases the valve member 114 toward the valve seat 116. Further, a valve rod 126 connects the valve member 114 to the moveable part 102 so that the valve member 114 moves as the moveable part 102 moves.

In the illustrated example, the valve member 114 is moveable away from the valve seat 116 for opening the valve mechanism 112 to enable fluid flow 130 through an opening 132, past the valve seat 116, and out the openings 122. On the other hand, when the valve member 114 is in contact with the valve seat 116, fluid flow through the valve mechanism 112 is prevented. Furthermore, while in this example, movement of the movable part 102 away from the static part 104 opens the valve mechanism 112, in other examples, the opening may be in response to movement of the movable part toward the static part 104. Accordingly, numerous other valve mechanism configurations will be apparent to those of skill in the art having the benefit of the disclosure herein, and implementations herein are not limited to any particular valve mechanism configuration.

A solenoid coil 140 surrounds at least a portion of the static part 104. The solenoid coil 140 is contained within a yoke 142, and may be further contained by a plate 144. In addition, an outer static part 146, also referred to as an outer core in some examples, may encircle or may otherwise be located adjacent to the movable part 102 and may also be adjacent to the yoke 142 and/or the solenoid coil 140. Furthermore, a return spring 148 may be located within a hollow bore 150 of the static part 104 and a hollow cup 152 of the movable part 102. For example, the core spring 148 may bias the movable part 102 away from the static part 104.

When electricity is passed through the solenoid coil 140, such as in response to a control signal, the solenoid coil 140 generates an electromagnetic field. The magnetic flux created by the solenoid coil 140 may be concentrated and may flow smoothly through the magnetic materials located in the vicinity of the solenoid coil. For example, the magnetic flux may travel through a magnetic circuit 160 formed by the yoke 142, the outer static part 146, the moveable part 102, the static part 104, the plate 144, and back to the yoke 142. The magnetic reluctance of these parts may be substantially smaller than the reluctance in series that is created by a gap between the moveable part 102 and static part 104 in a conventional solenoid valve arrangement.

In the illustrated example, as discussed additionally below, the movable part 102 includes a generally cylindrical moveable body 156 and a cylindrical extension 162 on the mating end 108 having a generally hook shaped cross-section that extends from the static body toward the static part 104. The static part 104 has a generally cylindrical static body 158 and includes a complementary cylindrical extension 164 extending from the static body 158 in the direction of the movable part 102. The cylindrical extension 164 forms a cylindrical opening 166 on the mating end 110 of the static part 104 that opens into the bore 150, and also has a generally hook-shaped cross-section.

The cylindrical extension 162 of the movable part 102 may slide within or otherwise enter the cylindrical opening 166 formed by the cylindrical extension 164 on the static part 104. The magnetic flux in the magnetic circuit 160 may exert a magnetic force on any component within the magnetic circuit 160 if movement of that component assists in the reduction of the magnetic reluctance. Accordingly, when the moveable part 102 is subjected to the solenoid force in the magnetic circuit 160, the moveable part 102 is pulled toward the static part 104, along with the rod 126 and the valve member 114 to minimize a gap between the moveable part 102 and the static part 104, and thereby decrease the reluctance. Furthermore, the magnetic force increases sharply as the size of the gap between the movable part 102 and the static part 104 gets smaller, causing the moveable part 102 to accelerate, which drives the moveable part 102 at an increasingly higher velocity until the moveable part 102 impacts the static part 104. The noise radiated from this impact may cause an audible ticking sound as the moveable part 102 contacts the static part 104. When the electric power to the solenoid coil 140 is stopped, the magnetic force no longer exists, and the return spring 148 pushes the moveable part 102, the rod 126, and the valve member 114 towards the valve base 120, compressing the valve spring 124 until the valve member contacts the valve base 120.

In some examples, the rod 126 is secured to the moveable part 102 and is not secured to the valve member 114. Accordingly, in such a configuration there may be four impact events occur during one solenoid cycle. To list these in the time sequence when the solenoid switches to on and then off, these impacts are respectively (1) valve member 114 contacts valve seat 116; (2) the moveable part 102 contacts the static part 104; (3) the rod 126 contacts the valve member 114; and (4) the valve member 114 contacts the valve base 120. Among these, the inventors herein have determined that the noise from the impact between the moveable part 102 and the static part 104 is the most dominant noise, since the impact velocity of the moveable part 102 is the highest as a result of the large magnetic force applied to accelerate the moveable part 102.

The configuration of FIG. 1 reduces this noise by reducing the impact velocity of the moveable part 102 when impacting the static part 104. In particular, in the example illustrated in FIG. 1, as the cylindrical extension 162 of the moveable part 102 moves to be adjacent to the cylindrical extension 164 of the static part 104, the magnetic flux passes through the adjacent surfaces, thereby reducing the amount of axial magnetic force pulling the moveable part 102 toward static part 104. Thus, because the amount of axial magnetic force is reduced, the speed of impact of the moveable part 102 with the static part 104 is reduced as compared to a conventional configuration.

Figure 2:
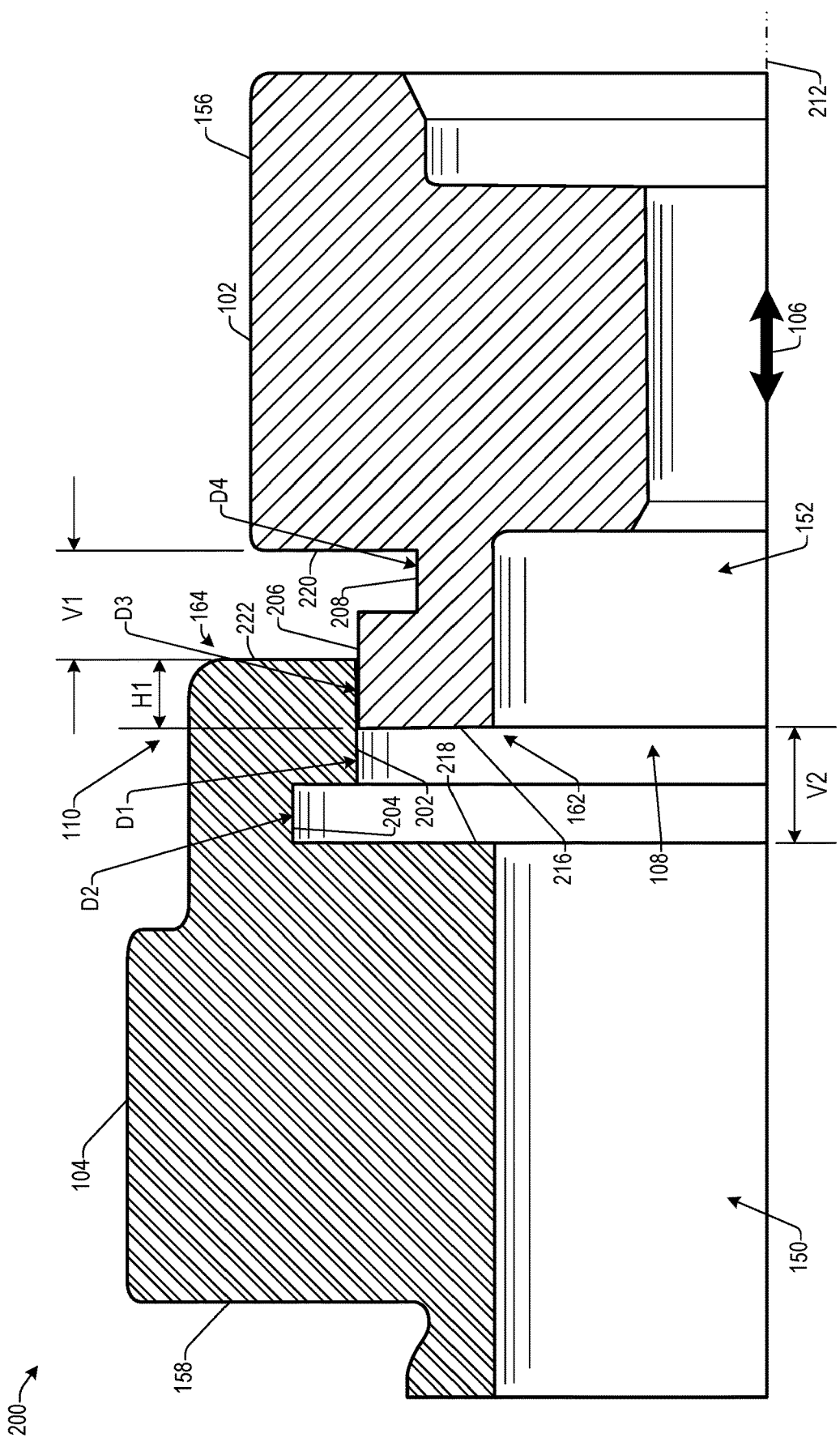
FIG. 2 illustrates an enlarged partial cross-section view of the moveable part and static part according to some implementations.

FIG. 2 illustrates an enlarged partial cross-section view 200 of the moveable part 102 and static part 104 according to some implementations. In this example, the cylindrical extension 164 of the static part 104 includes a cylindrical inner surface 202 having a first diameter D1 and a cylindrical inner groove 204 having a second diameter D2. The second diameter D2 of the inner groove 204 is larger than the first diameter D1 of the cylindrical inner surface 202. Accordingly, the cylindrical inner groove 204 serves as an undercut that partially magnetically isolates the cylindrical inner surface 202 to control the timing of the transfer of the magnetic flux at a desired time during the movement of the movable part 102 for effectively decreasing the acceleration of the movable part 102.

In addition, the movable part 102 includes the cylindrical extension 162, which has a cylindrical outer surface 206 having a third diameter D3 and a cylindrical outer groove 208 having a fourth diameter D4. The diameter D4 of the cylindrical outer groove 208 is smaller than the diameter D3 of the cylindrical outer surface 206. The cylindrical outer groove 208 may provide an undercut that also partially magnetically isolates the cylindrical outer surface 206 to enable control of the timing of the passage of a portion of the magnetic flux from the movable part 102 to the static part 104. Furthermore, the diameter D3 of the cylindrical outer surface 206 is smaller than the diameter D1 of the cylindrical inner surface 202 of the static part 104. Accordingly, the cylindrical extension 162 of the movable part 102 may be sized to slide within or otherwise fit within the cylindrical extension 164 of the static part 104 such that the outer cylindrical surface 206 slides against or is positioned closely adjacent to the cylindrical inner surface 202 to enable passage of the magnetic flux from the movable part 102 to the static part 104 in a radial direction, e.g., radially away from the central axis of movement 212 of the movable part 102. As the movable part 102 moves toward the static part 104, an impact may occur, such as an impact of a vertical face 216 of the cylindrical extension 162 with an inner vertical wall 218 of the static part 104, and/or by impact of an outer vertical wall 220 with a vertical face 222 of the cylindrical extension 164.

In this example, the magnetic flux has several possible primary paths: for instance the magnetic flux may act axially across the gap between the vertical wall 220 and the vertical face 222, as indicated by V1; additionally, the magnetic flux may act across the gap between the vertical wall 218 and the vertical face 216, as indicated by V2; in addition, the magnetic flux may cross between the outer cylindrical surface 206 and the cylindrical inner surface 202 when the outer cylindrical surface 206 and the cylindrical inner surface 202 have a magnetic flux bypass surface area when they are adjacent to each other, as indicated at H1. The action of the magnetic flux across the gaps V1 and V2 causes the axial force that moves the moveable part 102 toward the static part 104, while the magnetic flux across the horizontal bypass surface area H1 does not contribute to the generation of the axial force, but serves to essentially bypass or otherwise remove a portion of the magnetic flux in the radial direction across the surface area H1, thereby also reducing the amount of magnetic flux across the gaps V1 and V2, and thus reducing the axial force on the movable part 102.

Figure 3A:
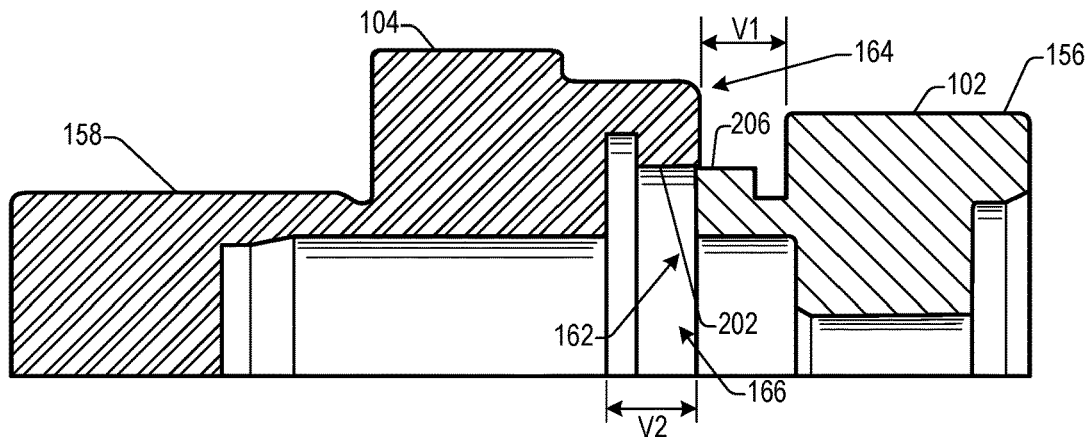
FIG. 3A illustrates a start position of the movable part such as when the solenoid is activated according to some implementations.
Figure 3B:
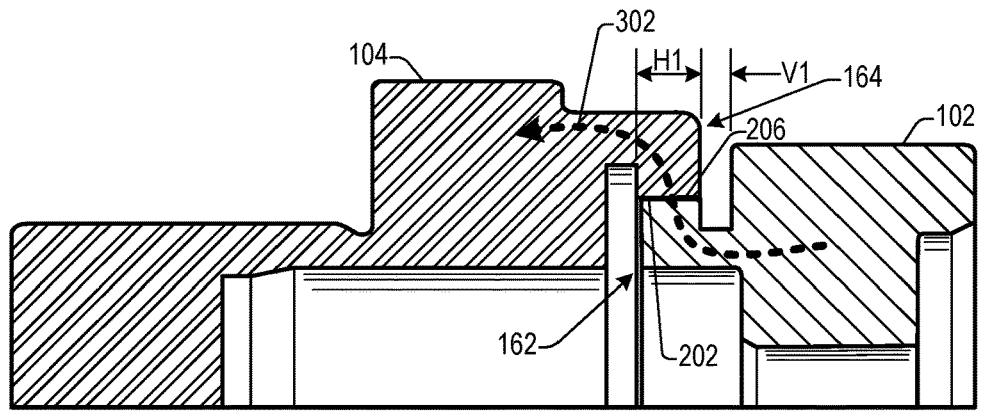
FIG. 3B illustrates the movable part and the static part of FIG. 3A at a middle position according to some implementations.
Figure 3C:
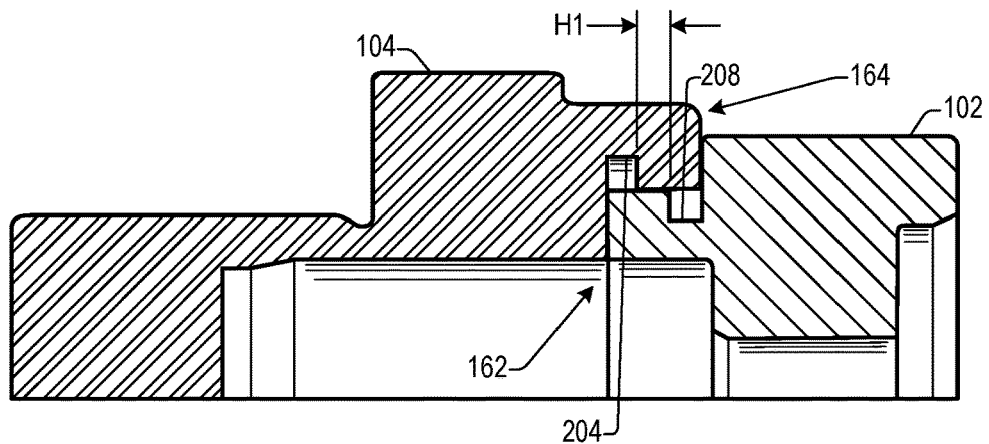
FIG. 3C illustrates the movable part and the static part of FIG. 3B at end position according to some implementations.

FIGS. 3A-3C illustrate a partial cross-sectional view of the moveable part 102 and the static part 104 showing start, middle and end positions of the moveable part 102 according to some implementations.

FIG. 3A illustrates a start position of the movable part 102 such as when the solenoid is activated according to some implementations. In this example, the gaps V1 and V2 are at a maximum, and there is no common service area H1 between the cylindrical extension 162 of the movable part 102 and the cylindrical extension 164 of the static part 104. Accordingly, when the solenoid is activated, a magnetic flux across the gaps V1 and V2 causes an axial force that pulls the movable part 102 toward the static part 104. At this point, the bypass surface area H1 is minimal and therefore, the majority of the magnetic flux acts across the gaps V1 and V2, which causes the initial movement of the moveable part 102 in the axial direction towards the static part 104.

FIG. 3B illustrates the movable part 102 and the static part 104 of FIG. 3A at a middle position according to some implementations. In this example, the moveable part 102 starts from the position shown in FIG. 3A, where the cylindrical extension 162 of moveable part 102 is slightly inside cylindrical extension 164 of the static part 104. As the bypass surface area H1 is small at the start position of FIG. 3A, the majority of the magnetic flux passes axially across the gaps V1 and V2. As the moveable part 102 travels towards the static part 104 to the midway position shown in FIG. 3B, a portion of the magnetic flux is bypassed in the radial direction across the bypass surface area H1 as the bypass surface area H1 increases, as illustrated by the dashed line 302. In other words, the axial magnetic force applied on the moveable part 102 decreases as compared with the initial position of FIG. 3A.

FIG. 3C illustrates the movable part 102 and the static part 104 of FIG. 3B at end position according to some implementations. After the movable part moves past the middle position illustrated in FIG. 3B, the groove 208 of the moveable part 102 and the groove 204 of the static part 104 come into play to reduce the bypass surface area H1 so that less magnetic flux pass through the bypass surface area H1. Also, as the gaps V1 and V2 continues to shrink, the axial force increases again briefly such as for overcoming the spring force of the return spring 148 (not shown in FIG. 3C) until the moveable part 102 touches the static part 104, as illustrated in FIG. 3C.

The impact between the moveable part 102 and the static part 104 is driven by the magnetic force generated by the solenoid coil. As one example, in the operation of a pump, the solenoid may be on for a very brief time. The magnetic force is initially relatively low because the gaps V1 and V2 between the moveable part 102 and the static part 104 are relatively large. As a result, the moveable part 102 may not move as quickly as possible, which may cause excessive gas flow into a pump compression chamber. In the meanwhile, as the gaps V1 and V2 between the moveable part 102 and the static part 104 are reduced by movement of the movable part 102 toward the static part 104, the axial magnetic force increases substantially leading to the high impact velocity of the movable part in the conventional configuration. Accordingly, the examples of FIGS. 1-3C and the other examples disclosed herein enable the magnetic force to be higher when the solenoid switches on to enable the moveable part 102 to respond quickly, and then decrease magnetic axial force as the moveable part 102 moves towards the static part 104 to obtain a lower impact velocity.

Figure 4:
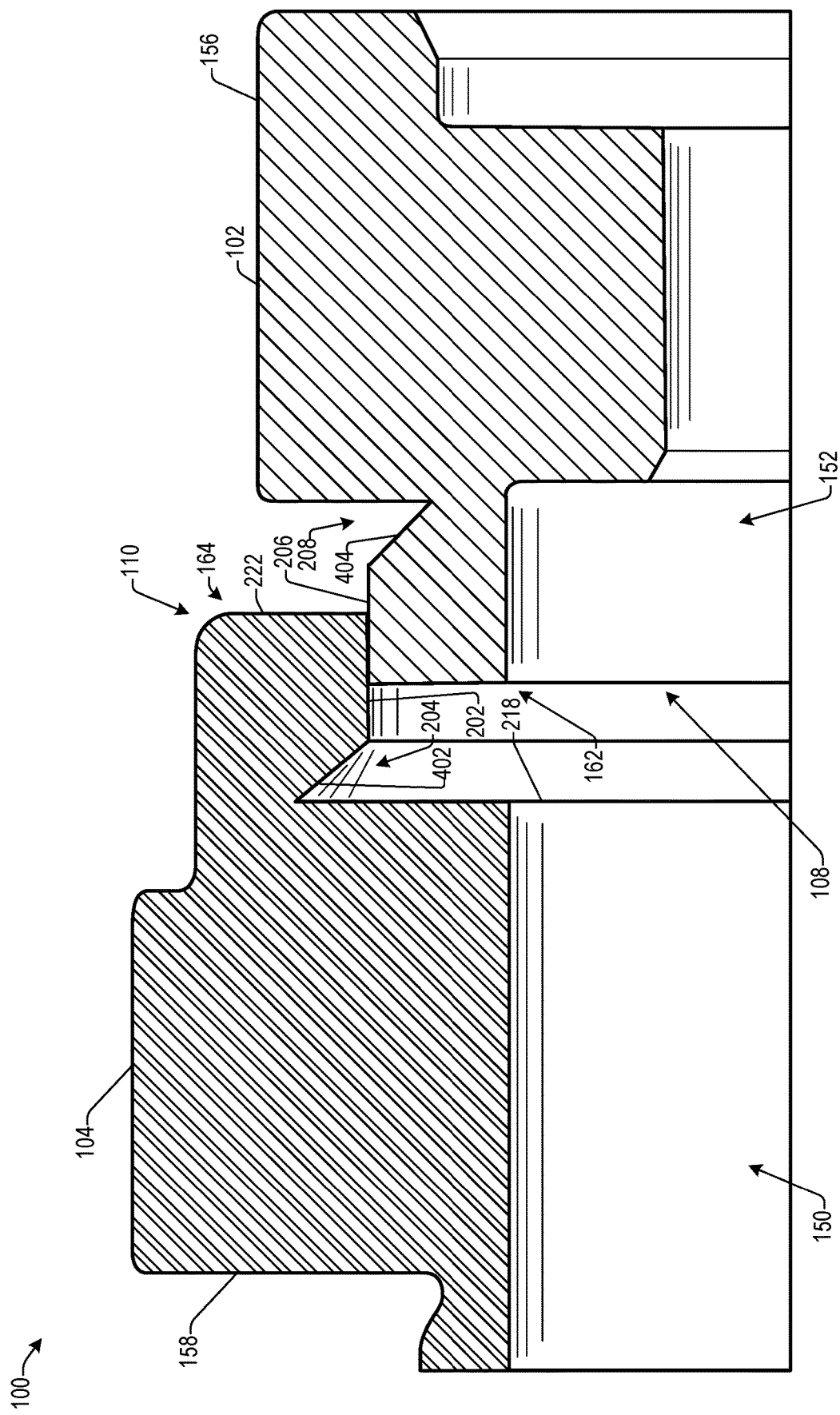
FIG. 4 illustrates an enlarged partial cross-section view of the moveable part and static part according to some implementations.

FIG. 4 illustrates an enlarged partial cross-section view 400 of the moveable part 102 and static part 104 according to some implementations. In the example discussed above with respect to FIGS. 1-3C, the grooves 204 and 208 are illustrated as having a rectangular cross-section. However, implementations herein are not limited to any particular shape for the grooves 204 and 208. To the contrary, numerous other cross-sectional shapes are possible.

In the example of FIG. 4, the groove 204 in the cylindrical extension 164 and the groove 208 in the cylindrical extension 162 have a triangular cross section. Thus, the groove 204 includes a declined wall 402 that declines away from the cylindrical inner surface 202 toward a bottom of the groove 204. Similarly, the groove 208 includes a declined wall 404 that declines away from the outer cylindrical surface 206 to the bottom of the groove 208. For instance, the configuration of the grooves 204 and 208 in this example may cause the axial magnetic force to increase less rapidly after the movable part 102 passes the midpoint discussed above with respect to FIG. 3B.

Figure 5:
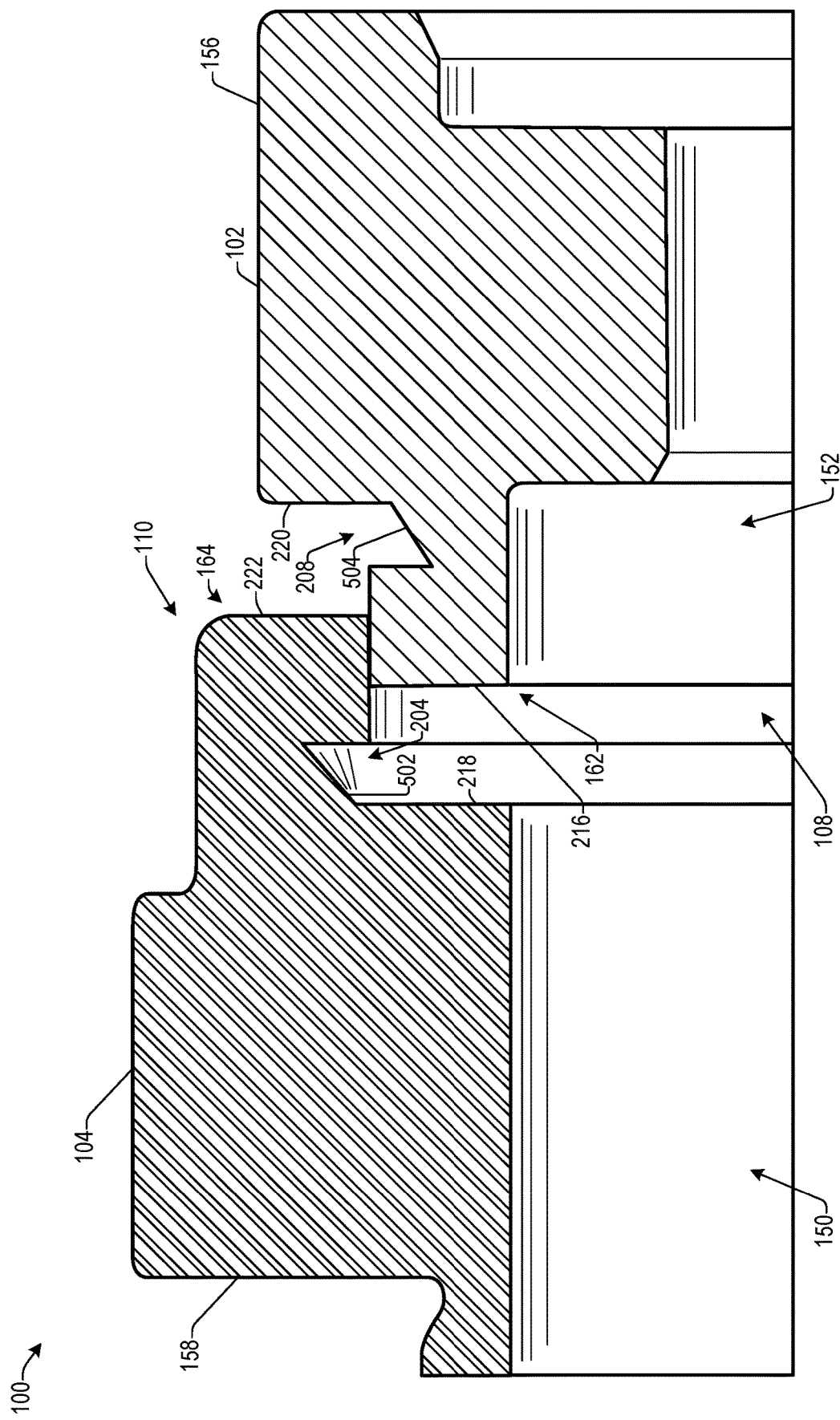
FIG. 5 illustrates an enlarged partial cross-section view of the moveable part and static part according to some implementations.

FIG. 5 illustrates an enlarged partial cross-section view 500 of the moveable part 102 and static part 104 according to some implementations. In the example of FIG. 5, the groove 204 in the cylindrical extension 164 and the groove 208 in the cylindrical extension 162 have a triangular cross-section essentially opposite to that discussed above with respect to FIG. 4. Thus, the groove 204 includes inclined wall 502 that inclines from a bottom of the groove 204 toward the inner vertical wall 218. Similarly, the groove 208 includes an inclined wall 504 that inclines from the bottom of the groove 208 toward the outer vertical wall 220. For instance, the configuration of the grooves 204 and 208 in this example may cause the axial magnetic force to begin decreasing as the movable part 102 approaches impact, as discussed above with respect to FIG. 3C.

Figure 6:
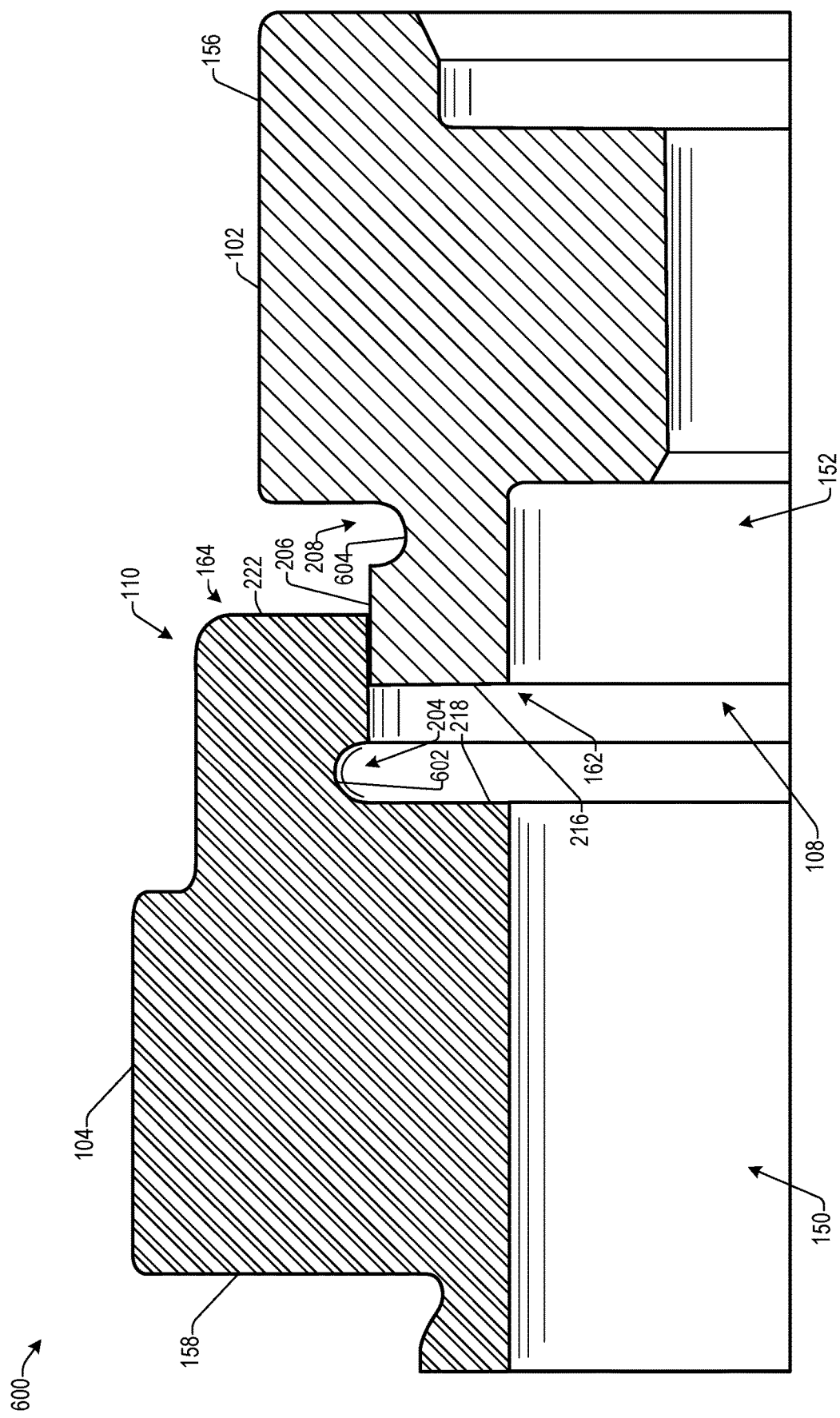
FIG. 6 illustrates an enlarged partial cross-section view of the moveable part and static part according to some implementations.

FIG. 6 illustrates an enlarged partial cross-section view 600 of the moveable part 102 and static part 104 according to some implementations. In the example of FIG. 6, the groove 204 in the cylindrical extension 164 and the groove 208 in the cylindrical extension 162 have a semicircular cross-section. Thus, the groove 204 includes a semicircular bottom 602 and the groove 604 includes a semicircular bottom 604.

Figure 7:
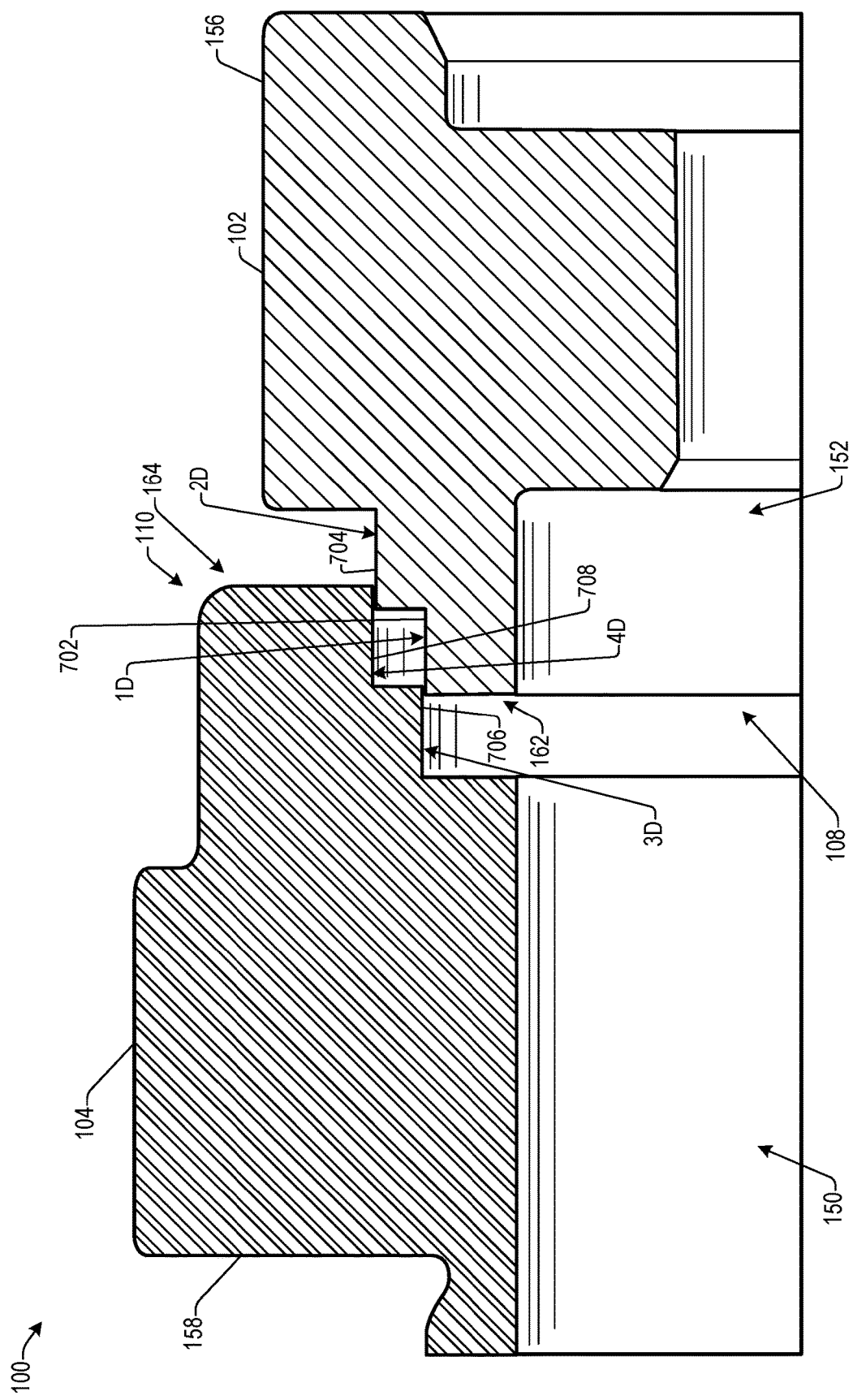
FIG. 7 illustrates an enlarged partial cross-section view of the moveable part and static part according to some implementations.

FIG. 7 illustrates an enlarged partial cross-section view 700 of the moveable part 102 and static part 104 according to some implementations. In the example discussed above with respect to FIGS. 1-6, the cylindrical extensions 164 and 162 generally are hook-shaped in cross-section. However, implementations herein are not limited to the hook-shaped discussed above.

In the example of FIG. 7, the cylindrical extension 164 and the cylindrical extension 162 have a stepped cross section. Accordingly, the cylindrical extension 162 on the movable part 102 includes a first outer cylindrical surface 702 and a second outer cylindrical surface 704. The first outer cylindrical surface 702 has a first outer diameter 1D that is smaller than a second outer diameter 2D of the second cylindrical outer surface 704. Additionally, the cylindrical extension 164 on the static part 104 includes a first cylindrical inner surface 706 and a second cylindrical inner surface 708. The cylindrical inner surface 706 may have a first inner diameter 3D that is smaller than a second inner diameter 4D of the second cylindrical wall 708. In addition, the first outer diameter 1D of the first cylindrical outer surface 702 may be slightly smaller than the inner diameter 3D of the first cylindrical inner surface 706 to enable a sliding fit or clearance fit, between the first cylindrical outer surface 702 and the first cylindrical inner surface 706. Similarly, the second outer diameter 2D of the second cylindrical outer surface 704 may be slightly smaller than the inner diameter 4D of the second cylindrical inner surface 708 to enable a sliding fit or clearance fit between the second cylindrical outer surface 704 and the second cylindrical inner surface 708.

In the example of FIG. 7, as the movable part 102 moves toward the static part 104, a first magnetic flux bypass surface area is formed between the first cylindrical outer surface and the first cylindrical inner surface. Thereby reducing a portion of the axial magnetic flux. Furthermore, as the movable part 102 advances further toward the static part 104, the second cylindrical outer surface 704 becomes adjacent to the second cylindrical inner surface 708 thereby further reducing the magnetic flux in the axial direction an increase in the magnetic flux bypass in the radial direction through both the first cylindrical inner surface 706 and the second cylindrical inner surface 708.

Figure 8:
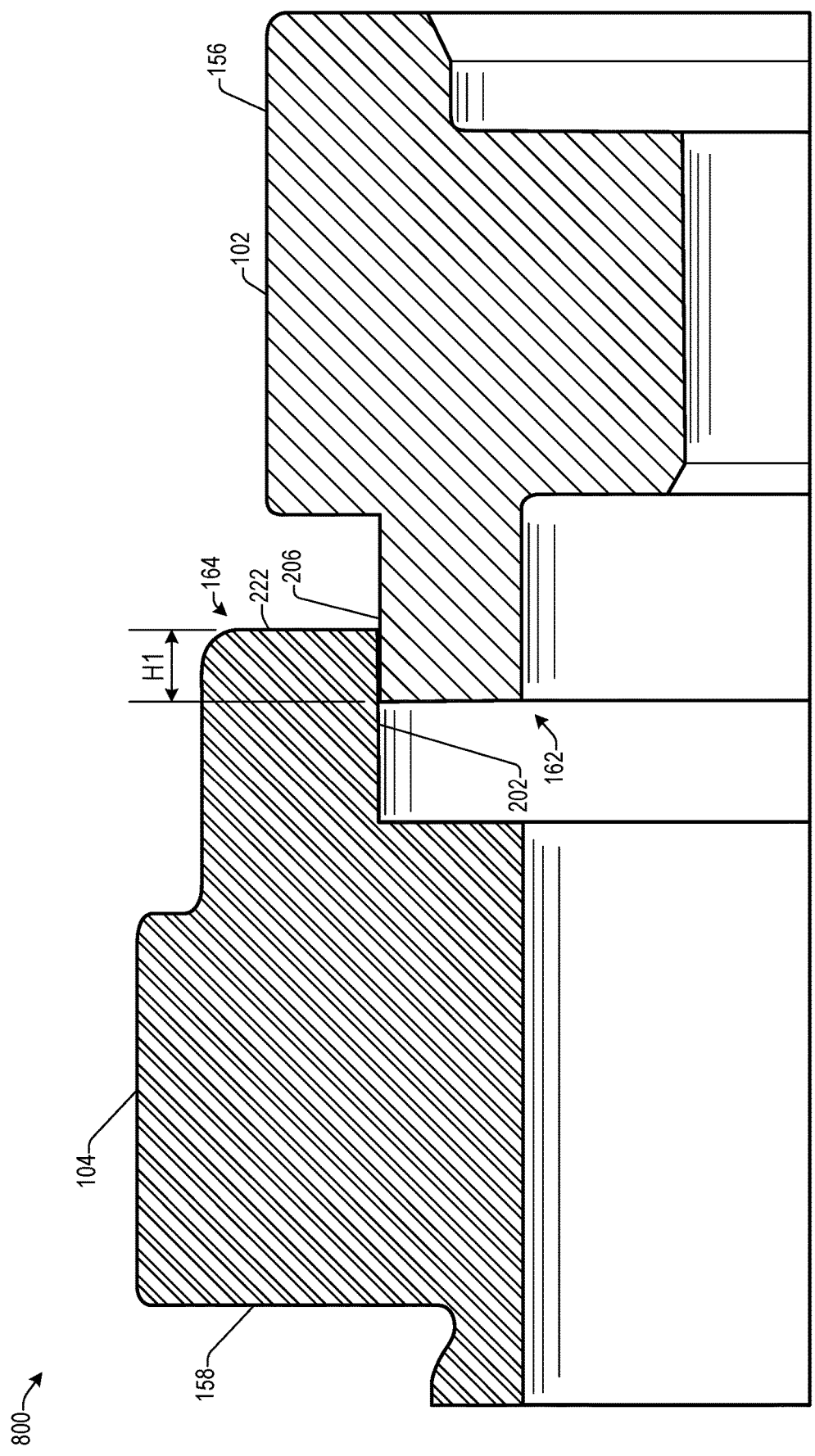
FIG. 8 illustrates an enlarged partial cross-section view of the moveable part and static part according to some implementations.

FIG. 8 illustrates an enlarged partial cross-section view 800 of the moveable part 102 and static part 104 according to some implementations. In this example, the grooves 204 and 208 are eliminated so that the cylindrical extension 162 has a generally rectangular cross-section and the cylindrical extension 164 also has a generally rectangular cross-section. In this example, as the movable part 102 moves toward the static part 104, the bypass surface area H1 continues to increase, thereby continuing to increase the magnetic flux bypass in the radial direction as the moveable part 102 moves into contact with the static part 104.

Figure 9:
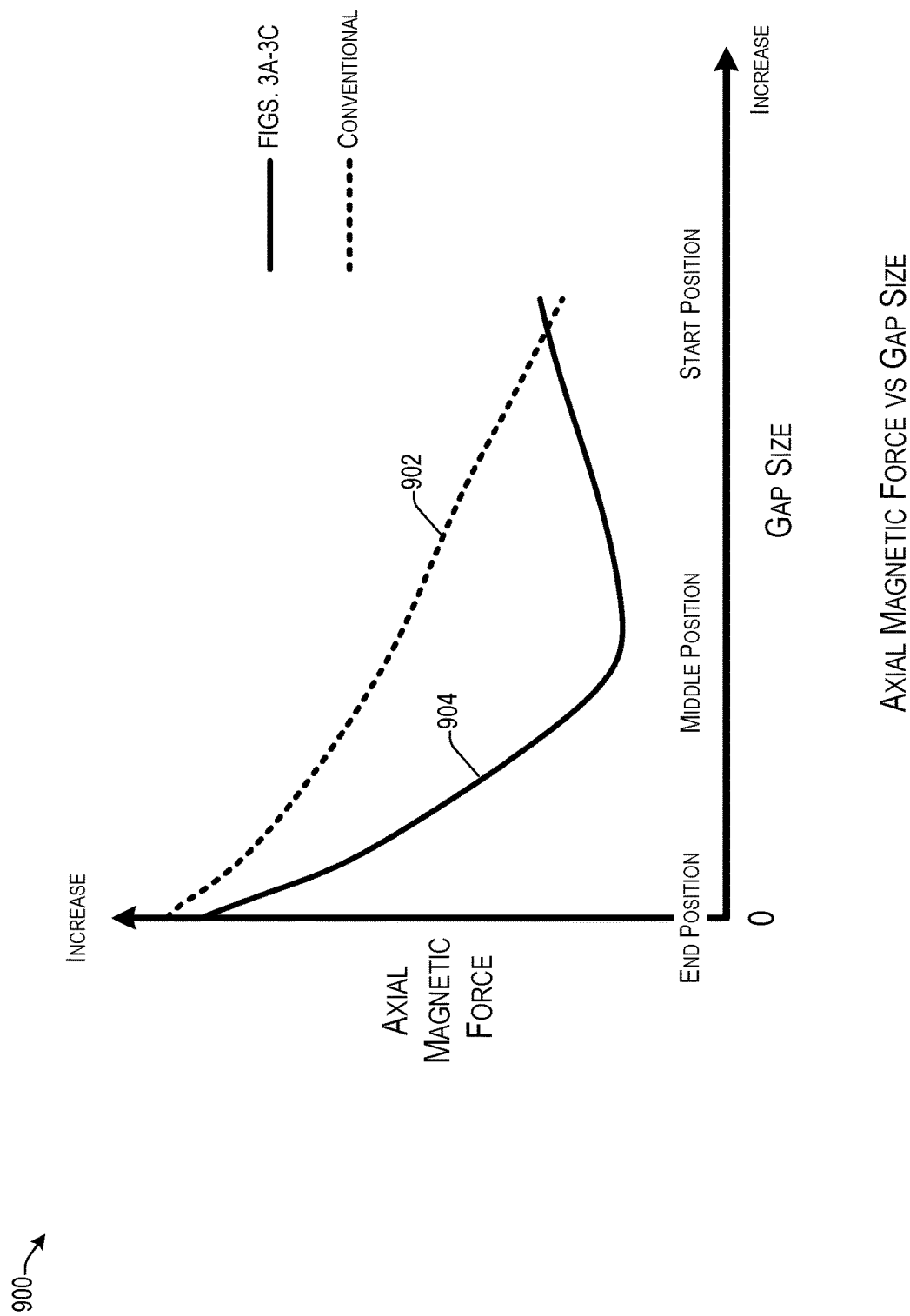
FIG. 9 is a graph illustrating axial magnetic force vs gap size according to some implementations.

FIG. 9 is a graph 900 illustrating axial magnetic force vs gap size according to some implementations. As discussed above with respect to FIGS. 2 and 3A-3C, the gap size may correspond to the gaps V1 and V2 discussed above. Furthermore, the example graph 900 may correspond to the example configuration discussed above with respect to FIGS. 3A-3C. In the graph 900, a conventional configuration is illustrated by the dashed line 902, and the configuration of FIGS. 3A-3C is illustrated by the solid line 904.

With respect to the conventional configuration, as shown at 902, the axial magnetic force increases substantially and generally consistently as the gap size decreases (corresponding to the moveable part 102 getting closer to the static part 104). On the other hand, as illustrated at 904, in the implementation of FIGS. 3A-3C, the axial magnetic force decreases initially when moveable part 102 moves toward the static part 104. As the moveable part 102 passes the vicinity of the middle position (corresponding to FIG. 3B), the axial magnetic force begins to increase. To compare the curve 904 with the curve 902, the axial magnetic force may be slightly higher at the start, which may lead to a faster initial movement of the moveable part 102. Furthermore, the work performed by the axial magnetic force (corresponding to the kinetic energy imparted to the moveable part 102) corresponds to the area under the respective curves 902 and 904. Thus, the area under each respective curve 902 and 904 indicated the amount energy that will later be dissipated via the impact of moveable part 102 with the static part 104. Accordingly, in the configuration of FIGS. 3A-3C, the moveable part 102 will have less impact energy, which indicates that the noise generated will be reduced substantially.

Figure 10:
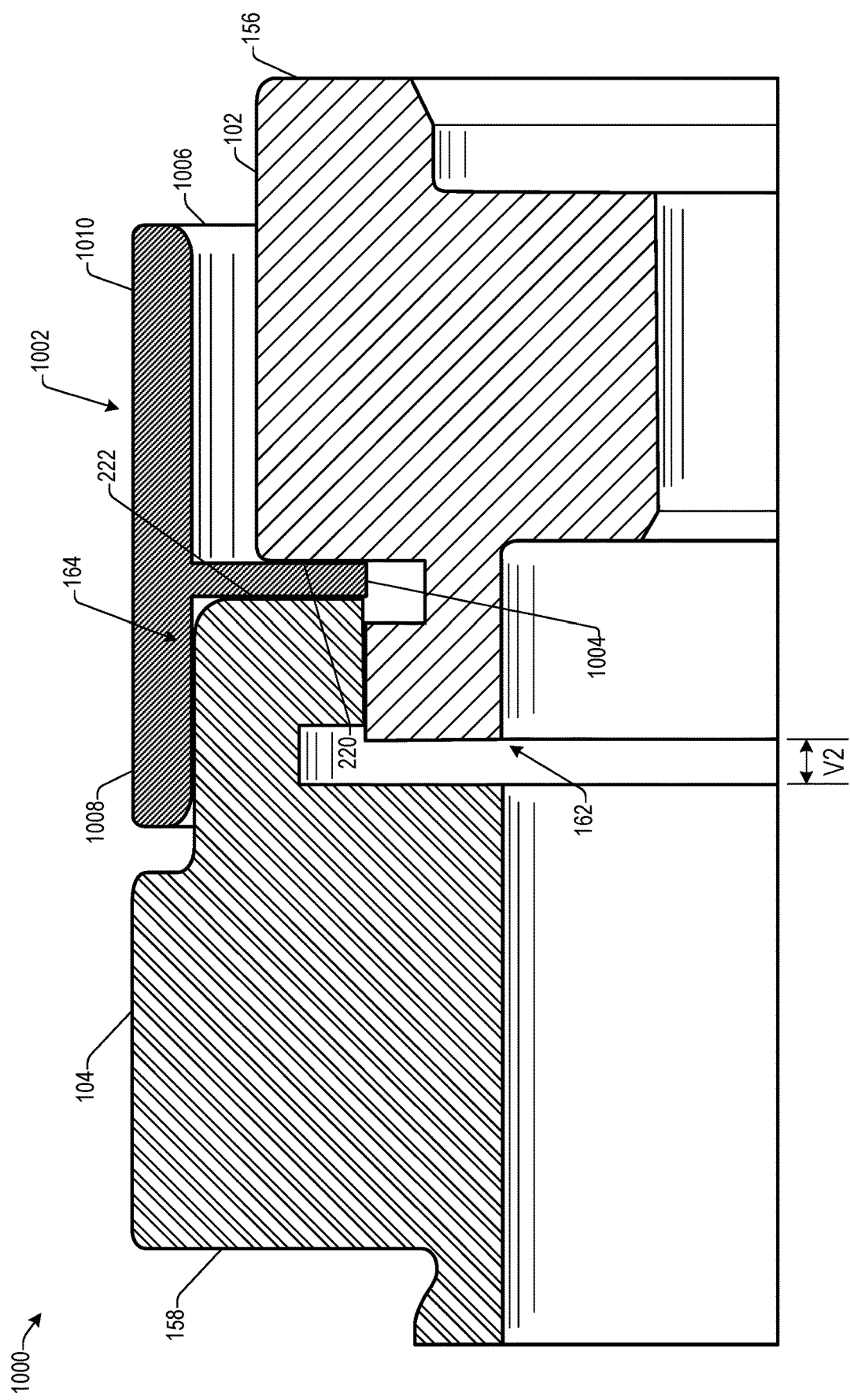
FIG. 10 illustrates an enlarged partial cross-section view of the moveable part and static part with a spacer ring according to some implementations.

FIG. 10 illustrates an enlarged partial cross-section view 1000 of the moveable part 102 and static part 104 with a spacer ring 1002 according to some implementations. In this example, a nonmagnetic spacer ring 1002 may include an inwardly extending flange 1004. The flange 1004 may extend between the outer vertical wall 220 on the movable part 102 and the vertical face 222 on the cylindrical extension 164 of the static part 104. In addition, the spacer ring 1002 is generally T-shaped in cross-section and a cylindrical ring-shaped body 1006 from which the flange 1004 extends. A first part 1008 of the cylindrical ring-shaped body 1006 overlaps the cylindrical extension 164 of the static part 104 and a second part 1010 of the cylindrical ring-shaped body overlies the moveable part 102 when engaged with the static part 104. In some examples, the second part 1010 of the cylindrical ring-shaped body may be eliminated and the spacer ring may be L-shaped in cross-section, rather than T-shaped.

The spacer ring 1002 may be constructed of a nonmagnetic material. Accordingly, the spacer ring 1002 does not influence the axial magnetic force on the moveable part 102, such as discussed above with respect to FIG. 9. Furthermore, the inwardly extending flange 1004 of the spacer ring 1002 may cover the vertical face 222 of the static part 104 and serve as a cushion between the moveable part 102 and the static part 104 during impact. In addition, the nonmagnetic material may be selected to have superior mechanical properties such as wear resistance and durability as compared with the materials of the moveable part 102 and the static part 104, which may be ferromagnetic steels. Furthermore, the spacer ring 1002 enables the axial magnetic force to achieve a more consistent profile because of the movable part is prevented from traveling the final distance towards the static part 104. For example, the gap V2 remains unclosed and therefore a sharp rise in axial magnetic force as the movable part 102 approaches closely to the static part 104 is avoided. Examples of suitable nonmagnetic materials that may be used to construct the spacer ring 1002 may include 300 series stainless steels, bronze, brass, copper, aluminum, and various polymers. The spacer ring 1002 may be employed with any of the example implementations disclosed herein. Furthermore, in some examples, the spacer ring 1002 may also serve as seal between the static part 104 and the outer static part 146 (aka the outer core) such as to help prevent fluid from leaking from the valve.

Figure 11:
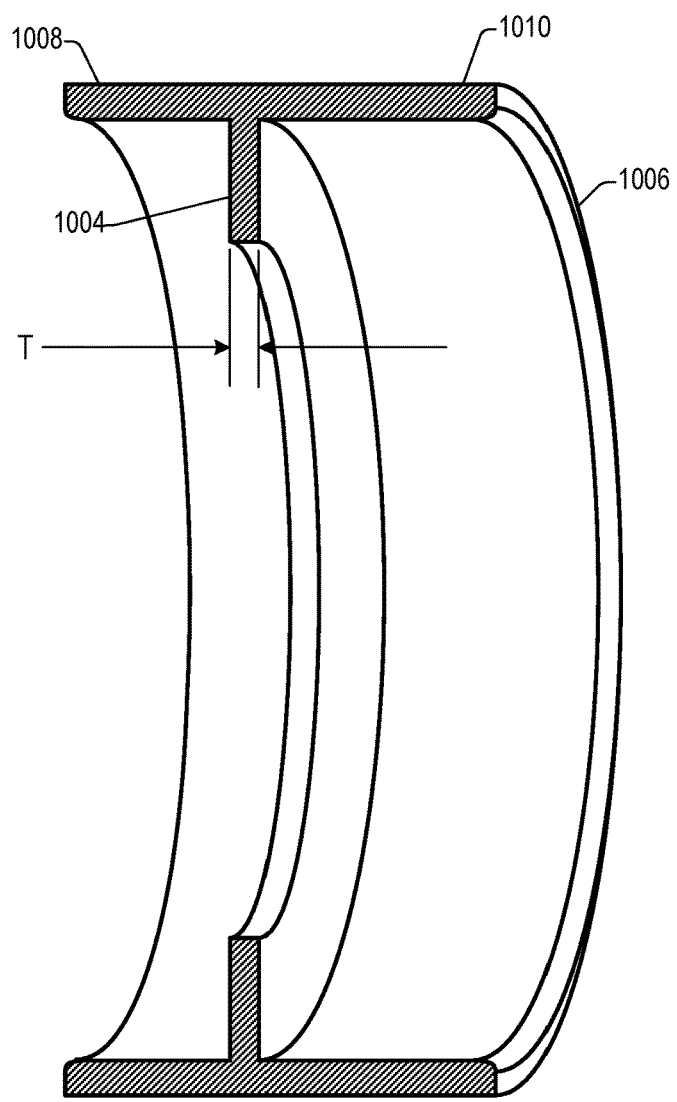
FIG. 11 is a cross-sectional view of the spacer ring according to some implementations.

FIG. 11 is a cross-sectional view of the spacer ring 1002 according to some implementations. In this example, the spacer ring 1002 includes the generally ring-shaped body 1006. The inwardly extending flange 1004 extends inward a sufficient distance to interpose between the vertical face 222 and the vertical wall 220 as discussed above with respect to FIG. 10, or other portions of the static part and the moveable part to provide a spacer between the static part and the moveable part. In addition, the inwardly extending flange 1004 may have a thickness T that is selected based on a desired spacing for keeping the movable part 102 away from the static part 104 (not shown in FIG. 11) in the axial direction. For example, the thickness T of the flange 1004 may be sized to maintain a space between the moveable part and the static part to limit an amount of axial magnetic force exerted on the moveable part. As a non-limiting example, the thickness T may be between 0.1 and 1 mm, depending on the material used. Furthermore, while the spacer ring 1002 is illustrated as having a generally T-shaped cross-section in this example, in other examples, spacer rings 1002 having other cross-sections may be used. For example, body portion 1010 may be eliminated and the spacer ring 1002 may have an L-shaped cross-section or the like.

Figure 12:
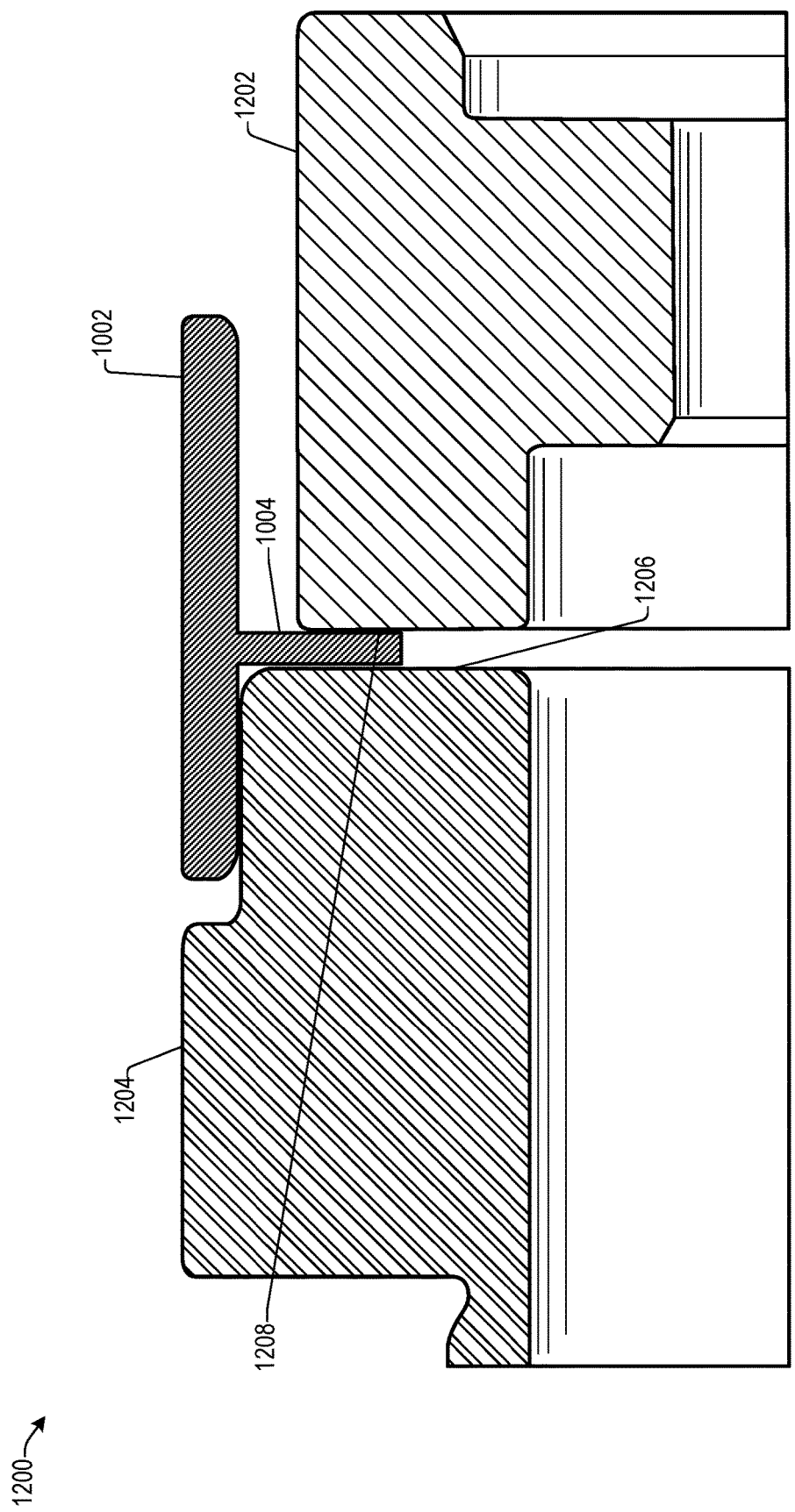
FIG. 12 is a cross-sectional view of a conventional movable part and a conventional static part including a non-magnetic spacer ring according to some implementations.

FIG. 12 is a cross-sectional view 1200 of a conventional movable part 1202 and a conventional static part 1204 including a non-magnetic spacer ring 1002 according to some implementations. In this example, the spacer ring 1002 includes the flange 1004, which is interposed between a vertical face 1206 of the conventional static part 1204 and a vertical wall 1208 of the conventional moveable part 1202. Accordingly, even in the conventional configuration illustrated in FIG. 12, the nonmagnetic spacer ring 1002 may serve to reduce the impact noise by acting as a cushion and further by reducing the acceleration of the movable part 1202 toward the conventional static part 1204 by the thickness of the flange 1004.

Figure 13:
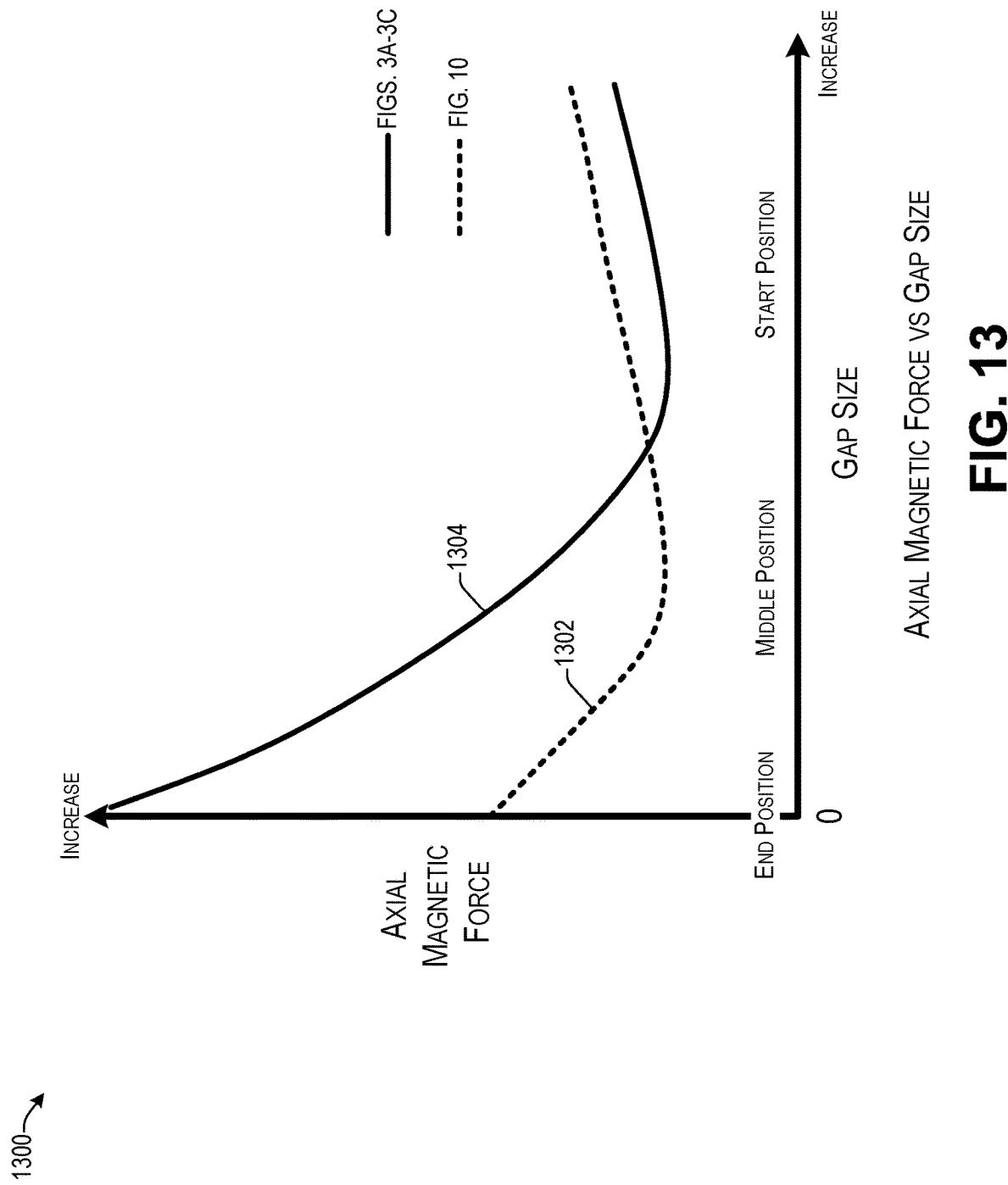
FIG. 13 is a graph illustrating axial magnetic force vs gap size including the non-magnetic spacer ring according to some implementations.

FIG. 13 is a graph 1300 illustrating axial magnetic force vs gap size with non-magnetic spacer ring according to some implementations. In the graph 1300, an example of the axial magnetic force of the implementation of FIG. 10 (with the spacer ring) is indicated by the curve 1302, and an example of the axial magnetic force of the implementation of FIGS. 3A-3C (without the spacer ring) is indicated by the curve 1304. The curve 1302 (with the non-magnetic spacer ring present) shows that the spacer ring reduces the energy transferred to the moveable part 102 based on the smaller area under the curve 1302 as compared to the area under the curve 1304. This may be due at least in part because the moveable part 102 will impact and reside on the spacer ring instead of the static part 104.

Figure 14:
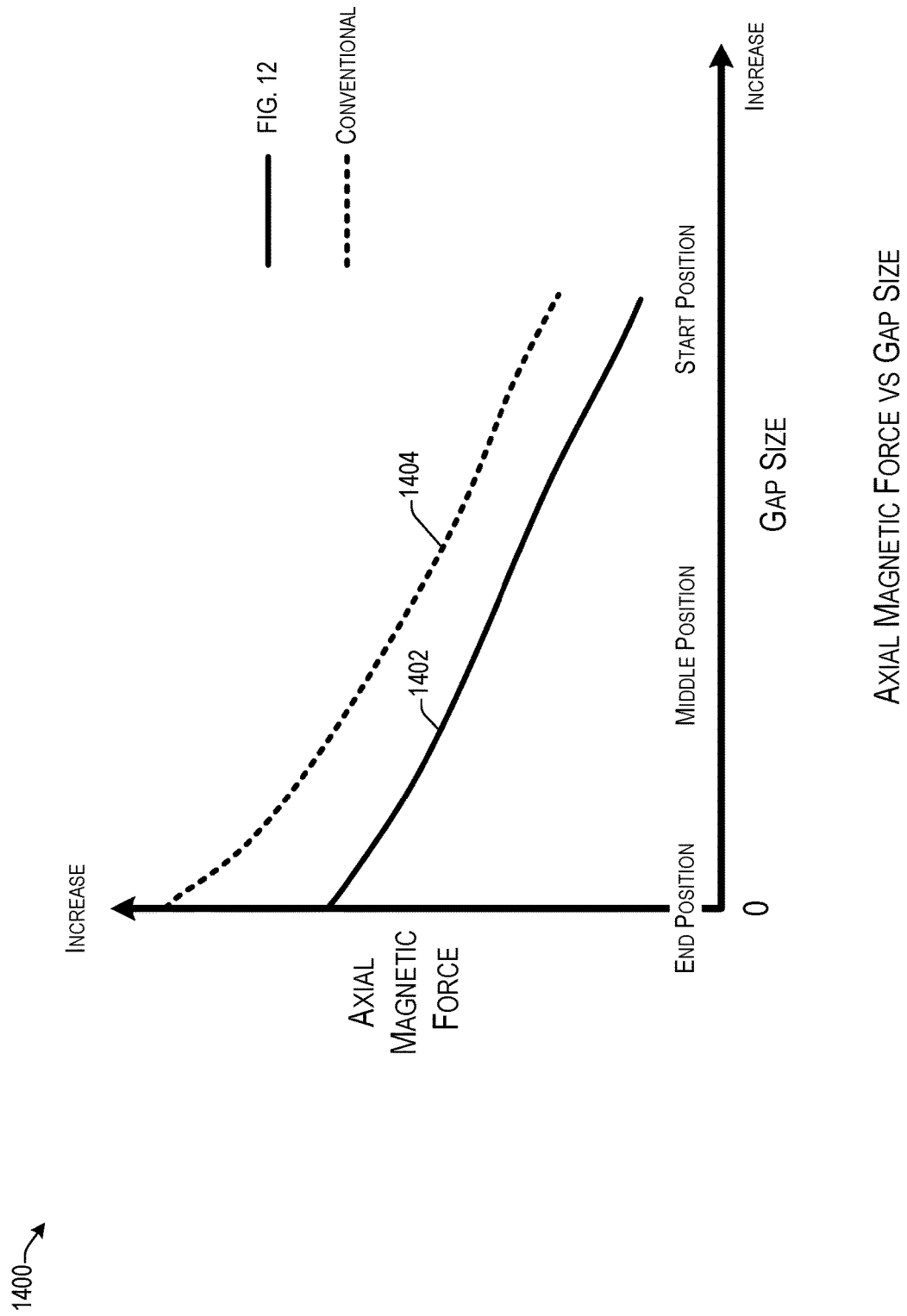
FIG. 14 is a graph illustrating axial magnetic force vs gap size with the non-magnetic spacer ring added to a conventional configuration according to some implementations.

FIG. 14 is a graph 1400 illustrating axial magnetic force vs gap size with the non-magnetic spacer ring according to some implementations. In the graph 1400, an example of the axial magnetic force of the implementation of FIG. 12 (i.e., a conventional configuration with the spacer ring added) is indicated by the curve 1402, and an example of the axial magnetic force of the conventional configuration (without the spacer ring) is indicated by the curve 1404. The curve 1402 (with the non-magnetic spacer ring present) shows that the spacer ring reduces the energy transferred to the moveable part 102 based on the smaller area under the curve 1402 as compared to the area under the curve 1404. This may be due at least in part because the moveable part 1202 will impact and reside on the spacer ring instead of the static part 1204.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A valve comprising:
   a valve mechanism;
   a solenoid coil able to be activated to generate a magnetic flux;
   a static part located at least partially within the solenoid coil, the static part including a static body and a first cylindrical extension extending from the static body, the first cylindrical extension including an open end with a cylindrical inner surface having a first diameter, the first cylindrical extension further including an inner groove located between the cylindrical inner surface and the static body, the inner groove having a second diameter, wherein the second diameter of the inner groove is larger than the first diameter of the cylindrical inner surface; and
   a moveable part being moveable toward the static part by the magnetic flux in response to activation of the solenoid coil for changing a condition of the valve mechanism, the moveable part including a moveable body and a second cylindrical extension extending from the moveable body, the second cylindrical extension including a cylindrical outer surface having a third diameter and an outer groove located between the cylindrical outer surface and the moveable part, the outer groove having a fourth diameter that is less than the third diameter,
   wherein the third diameter is smaller than the first diameter to enable the cylindrical outer surface to move within the open end toward the static body, and the third diameter is sized to enable the cylindrical outer surface to pass adjacent to the cylindrical inner surface to cause passage of a portion of the magnetic flux in a radial direction from the cylindrical outer surface to the cylindrical inner surface to reduce an acceleration of the moveable part toward the static part due to the magnetic flux; and
   a spacer ring having a flange extending inward and positioned between a least a portion of the static part and a portion of the moveable part in a location to cushion an impact between the moveable part and the static part.

2. The valve as recited in claim 1, wherein the spacer ring is T-shaped or L-shaped in cross section, having cylindrical body portion that overlies a portion of the first cylindrical projection of the static body.

3. The valve as recited in claim 1, wherein the spacer ring is constructed of a non-ferromagnetic material.

4. The valve as recited in claim 1, wherein at least one of the inner groove or the outer groove has a triangular cross section.

5. The valve as recited in claim 1, wherein at least one of the inner groove or the outer groove has a semicircular cross section or a rectangular cross-section.

6. The valve as recited in claim 1, further comprising:
   a bore in the static part in communication with the open end; and
   a return spring positioned within the bore to apply a bias against the moveable part in opposition to a direction of movement of the movable part due to the magnetic flux.

7. An apparatus comprising:
   a solenoid coil able to be activated to generate a magnetic flux;
   a static part located proximate to the solenoid coil, the static part including a static body and a first cylindrical extension extending from the static body, the first cylindrical extension including an open end with a cylindrical inner surface having a first diameter;
   a moveable part being moveable toward the static part by the magnetic flux in response to activation of the solenoid coil, the moveable part including a moveable body and a second cylindrical extension extending from the moveable body, the second cylindrical extension having a cylindrical outer surface having a second diameter wherein the second diameter is smaller than the first diameter to enable the cylindrical outer surface to move within the open end toward the static body, and the second diameter is sized to enable the cylindrical outer surface to pass adjacent to the cylindrical inner surface to enable passage of a portion of the magnetic flux radially from the cylindrical outer surface to the cylindrical inner surface to reduce an energy of impact between the moveable part and the static part due to the magnetic flux; and
   a spacer ring having a flange extending inward and positioned between a least a portion of the static part and a portion of the moveable part in a location to cushion an impact between the moveable part and the static part.

8. The apparatus as recited in claim 7, wherein the first cylindrical extension further includes an inner groove located between the cylindrical inner surface and the static body, the inner groove having a third diameter, wherein the third diameter of the inner groove is larger than the first diameter of the cylindrical inner surface.

9. The apparatus as recited in claim 8, wherein the second cylindrical extension further includes an outer groove located between the cylindrical outer surface and the moveable body, the outer groove having a fourth diameter that is less than the second diameter of the cylindrical outer surface.

10. The apparatus as recited in claim 9, wherein at least one of the inner groove or the outer groove has a triangular cross section.

11. The apparatus as recited in claim 9, wherein at least one of the inner groove or the outer groove has a semicircular cross section or a rectangular cross-section.

12. The apparatus as recited in claim 7, wherein the spacer ring is T-shaped in cross section and is constructed of a non-ferromagnetic material.

13. The apparatus as recited in claim 7, wherein the cylindrical inner surface is a first cylindrical inner surface, and the cylindrical outer surface is a first cylindrical outer surface, the apparatus further comprising:
the first cylindrical extension including a second cylindrical inner surface having a third diameter, wherein the third diameter is larger than the first diameter, wherein the first cylindrical inner surface is located between the second cylindrical inner surface and the static body; and
the second cylindrical extension including a second cylindrical outer surface having a fourth diameter, wherein the fourth diameter is larger than the second diameter, wherein the second cylindrical outer surface is located between the first cylindrical outer surface and the moveable body,
wherein the fourth diameter is smaller than the third diameter and larger than the first diameter to enable the second cylindrical outer surface to move within the open end adjacent to the second cylindrical inner surface to enable passage of another portion of the magnetic flux radially from the second cylindrical outer surface to the second cylindrical inner surface to reduce the energy of the impact between the moveable part and the static part due to the magnetic flux.

14. The apparatus as recited in claim 8, further comprising a valve mechanism for controlling a flow of fluid, wherein the moveable part is moveable toward the static part by the magnetic flux in response to the activation of the solenoid coil for changing a condition of the valve mechanism by at least one of opening or closing the valve mechanism.

15. An apparatus comprising:
a valve mechanism;
a solenoid coil able to be activated to generate a magnetic flux;
a static part located proximate to the solenoid coil, the static part including a static body;
a moveable part being moveable toward the static part by the magnetic flux in response to activation of the solenoid coil for changing a condition of the valve mechanism; and
a non-magnetic spacer ring having a flange extending inward and positioned between a least a portion of the static part and a portion of the moveable part in a location to cushion an impact between the moveable part and the static part,
wherein:
the static part includes a static body and a first cylindrical extension extending from the static body, the first cylindrical extension including an open end with a cylindrical inner surface having a first diameter,
the moveable part includes a moveable body and a second cylindrical extension extending from the moveable body, the second cylindrical extension having a cylindrical outer surface having a second diameter wherein the second diameter is smaller than the first diameter to enable the cylindrical outer surface to move within the open end toward the static body, and the second diameter is sized to enable the cylindrical outer surface to pass adjacent to the cylindrical inner surface to enable passage of a portion of the magnetic flux radially from the cylindrical outer surface to the cylindrical inner surface to reduce an energy of impact between the moveable part and the static part due to the magnetic flux,
the first cylindrical extension further includes an inner groove located between the cylindrical inner surface and the static body, the inner groove having a third diameter, wherein the third diameter of the inner groove is larger than the first diameter of the cylindrical inner surface, and
the second cylindrical extension further includes an outer groove located between the cylindrical outer surface and the moveable body, the outer groove having a fourth diameter that is less than the second diameter of the cylindrical outer surface.

16. The apparatus as recited in claim 15, wherein the non-magnetic spacer ring is at least one of T-shaped or L-shaped in cross-section.

17. The apparatus as recited in claim 15, wherein a thickness of the flange is sized to maintain a space between the moveable part and the static part to limit an amount of axial magnetic force exerted on the moveable part.

18. The apparatus as recited in claim 15, wherein at least one of the inner groove or the outer groove has a triangular cross section.

* * * * *